(12) United States Patent
Bulanyy

(10) Patent No.: US 9,807,985 B2
(45) Date of Patent: Nov. 7, 2017

(54) SYSTEM FOR CONTROLLING CLIMATE AND MOISTURE IN BEEHIVE

(71) Applicant: Igor Bulanyy, Edmonds, WA (US)

(72) Inventor: Igor Bulanyy, Edmonds, WA (US)

( * ) Notice: Subject to any disclaimer, the term of this patent is extended or adjusted under 35 U.S.C. 154(b) by 0 days.

(21) Appl. No.: 14/606,527

(22) Filed: Jan. 27, 2015

(65) Prior Publication Data

US 2016/0212976 A1    Jul. 28, 2016

(51) Int. Cl.
*A01K 47/06* (2006.01)

(52) U.S. Cl.
CPC .................................. *A01K 47/06* (2013.01)

(58) Field of Classification Search
CPC ............................... A01K 47/00; A01K 47/06
USPC ...................................... 449/3, 12, 13, 14, 50
See application file for complete search history.

(56) References Cited

U.S. PATENT DOCUMENTS

| 2,506,118 | A | * | 5/1950 | Taylor | A01K 47/06 |
| | | | | | 165/168 |
| 3,994,034 | A | | 11/1976 | Van Damme et al. | |
| 5,778,689 | A | * | 7/1998 | Beatenbough | A47F 3/043 |
| | | | | | 219/218 |
| 5,895,310 | A | * | 4/1999 | Otomo | A01K 67/033 |
| | | | | | 449/1 |
| 2003/0010771 | A1 | * | 1/2003 | Stanzel | E01C 11/265 |
| | | | | | 219/494 |
| 2011/0263182 | A1 | | 10/2011 | Custer et al. | |
| 2013/0273808 | A1 | | 10/2013 | Al Khazim Al Ghamdi | |

FOREIGN PATENT DOCUMENTS

| WO | WO 9628018 A1 * | 9/1996 | ............. A01K 47/06 |
| WO | WO 2010098853 A1 * | 9/2010 | ............. A01K 47/06 |

* cited by examiner

*Primary Examiner* — Lisa L Tsang
(74) *Attorney, Agent, or Firm* — Frank H. Pham

(57) ABSTRACT

A system controls climate and eliminates unwanted moisture within a honey beehive during low temperature conditions that promote condensate and mold inside of the beehives. The system comprises at least one humidistat being adapted to measure temperature and humidity inside the beehive, a first fan adapted to generate an air flow in at least a portion of the beehive, a heating element being installed in the bottom board of the beehive, and a second fan adapted to increase the air flow in another portion of the beehive, wherein the ventilation circuit controls the second fan according to the measured temperature and humidity condition. The system condenses and eliminates moisture produced by the bees' metabolism which otherwise may be deposited on the internal surface of the beehive as frost and later thaw, causing droplets of cold water to fall on the clustered bees.

14 Claims, 4 Drawing Sheets

SYSTEM FOR CONTROLLING CLIMATE AND MOISTURE IN BEEHIVE

BACKGROUND OF THE INVENTION

1. Field of the Invention

This invention relates to a prevention of buildup condensate and mold on the inner surface of the beehives caused by temperature and humidity conditions. In particularly, the invention relates to a beehive climate and moisture control system which prevents freezing air from entering the beehive and balances the temperature and humidity surrounding the cluster.

More particularly, this invention relates to a creation of balancing relationship between the sources of the heat, specially constructed winter ventilation inner cover, ventilation, ability to use the subject of invention at remote apiaries without permanent sources of electrical power.

2. Background Art

As the temperature inside the bee hive reach between 10 and 12° C. bees start to establish cluster. Because there is no air circulation inside the hive, temperatures at different levels of the hive would have tendency to stay different. Cluster can be built, based on bees aspiration toward warmer areas, at higher levels (elevations). As soon as cluster is set up, it is instinctively moving upward. The frames with food, located under the cluster will never be reached by bees, which would resulted by the end or even middle of cold season to lack of food and colony starve to death for that reason.

Excessive moisture within a beehive creates an unhealthy environment for bees during winter time. High humidity promotes decay of the wooden structures, mold growth and may contribute to dysentery and other health problems. During cold periods the bees form a cluster within and around the combs of honey, which supply food when foraging is no longer possible. When bees consume honey from comb frames, they heat up bee cluster only, but not surrounding area. Although the bees produce heat, the temperature inside beehive is essentially at the same temperature as the outside. Bees from the core feed on stored honey and gradually work to the outer layer of the cluster to change places with cold bees. While the bees can survive dry cold alone, a cold wet bee cannot survive.

To protect, bees from excess humidity condensation derived from accumulated moisture drops needs to be prevented in a way that they can drop onto semi-donnant bees. The moisture is accumulated from the heat of metabolism of the living cluster as they feed on stored honey. The small amount of heat generated nevertheless causes vapor to rise and condense upon the first cold surface it contacts.

When air with high water vapor content and relatively high Per Dew point met the surface of the ceiling, walls as well as frames surfaces with lower Per Due Dew point, it is start to condensate on their colder, practically equal to outside temperature surfaces. Large amount of honey, pollen which is organic substances and perfect food source in the bee hive create ideal environment for mold grow. There is a need to keep constantly removing any excessive moister out of the bee hive, but at the same time as much as possible avoiding to cool down the interior of the bee hive, especially cluster surrounding area. That why the main sensing device is not temperature sensor but humidity sensor, which is actually through the level of RH in used air watching two main parameters of humidity and temperature inside the beehive.

A need exists in the current art for an improved beehive climate and moisture control system that may be used during winter time. The present invention solves the problem by a beehive system according to claims 1 to 18.

SUMMARY OF THE INVENTION

In this particular invention, the climate and moisture control system comprises at least a condition control sensor being adapted to sense temperature and humidity condition in the beehive. The system further comprises ventilations fan being adapted to generate an air flow in the beehive and a heating element to preheat the air flow from outside. The system, in addition, comprises electronics connected to the condition control sensor, the ventilation fans, and the heating element. The electronics controls the ventilation fans and the heating element according to the sensed temperature and humidity condition in the beehive.

In one embodiment of the invention, the system comprises a first fan, which is arranged in a winter ventilation box and running continuously to create negative pressure inside the hive. Hence, the air flow generated by the first fan is more efficiently directed upwardly to the top of the beehive. The air flow generated by the first fan would have tendency to flow predominantly along the vertical walls of the colony brood boxes and outer frames.

The effect of having the fastest air flow mainly at the areas adjacent to the very first and very last frames of the upper brood box of typical standard 10 frames beehive can be improved by installing on the top of each frame wooden planks. These planks function like seals and create obstacle for the air flow from the space between the upper surface of the honey comb frames and inner surface of the winter ventilation inner cover.

According to a preferred embodiment, the winter ventilation box is further provided with a winter ventilation inner cover, which is adapted to let air pass through. The cover prevents dirt and bees from entering the winter ventilation box. Especially, when the fan is activated, the generated air flow may drive dirt or bees towards the box rather than moisture saturated air only.

Further, according to an even more preferred embodiment, the winter ventilation inner cover comprises a board with holes, a net and/or a mesh-like structure.

The board with holes, a net or a mesh-like structure, are easy to fabricate and are usually readily available in places where beehives are positioned. Moreover, they allow for an increased airflow through the board as compared to permeable membranes, which would otherwise be used, and which may also be used in conjunction with the present invention.

The winter ventilation further comprises ceiling foam insulation. Water condensed on the ceiling of the beehive is especially dangerous, because it is always created right above the cluster and dropped strait to the bees cluster. To prevent condensation on the inner surface, additional polystyrene foam insulation is used to shift temperature transition zone as well as steam saturated air Dew Point from inside the hive to outer layers of the foam.

In a preferred embodiment, the beehive climate and moisture control system further comprises a second fan adapted to generate an air flow in at least a portion of the beehive, wherein the second fan is connected to the electronics, and the electronics controls the second fan according to the sensed humidity and temperature condition.

This provides a second source for an air flow in the beehive. This allows for a more favorable distribution of the air flow in the housing. Moreover, the overall airflow may be increased by using two fans. It is even more preferred that the second fan is arranged in a top section of the housing.

In some embodiments, the first and second fan may have an operating voltage of 9-12 V DC. Moreover, the first and second fan and the electronics may further comprise means for converting supplied electrical power, e.g., the electronics may comprise a converter that is adapted to convert any of a 110 V and a 220V AC supply voltage to 9-12 V DC, which is then used to power the electronics and the first and second fan. The converting means may automatically detect the supply voltage and convert it accordingly.

In another preferred embodiment, the condition control sensor further comprises at least one humidity sensor and at least one temperature sensor, and the electronics activates the second fan if the sensed humidity is above an upper humidity threshold.

Additionally or alternatively, the electronics deactivates the first fan if the sensed humidity is below a lower humidity threshold.

These embodiments prevent the humidity in the beehive from rising above a given value. When the fan is deactivated, the air flow stops and the air exchange in the brood boxes is minimized, and thus diminish moisture building up inside the beehive.

In particular, the upper humidity threshold is between 80% and 90%, preferably between 83% and 85% and most preferably between 80% and 83% relative humidity. These upper humidity threshold values have been experienced to provide a good condition for the honeybees to survive and for the eggs of the queen to be hatched.

The electronics may further comprise any type of analog and digital or mixed-signal electronics. The electronics may further comprise at least one analog-to-digital converter for converting signals received from the condition control sensor.

According to a preferred embodiment, the beehive further comprises one or more ventilation openings. Providing one or more ventilation openings has the benefit of allowing air exchange between the inside and the outside of the beehive other than through an entrance opening for the bees. Fresh air may be expelled out of the bee hive to affect the temperature and humidity in the beehive.

Moreover, in some embodiments, the system may comprise more than two fans to provide a more detailed control of the air flow in the beehive. The fans are connected to and controlled by the electronics.

In a preferred embodiment, the system further comprises removable frames being arranged in the beehive.

The frames assist the bees building their honey combs. Providing frames usually leads to the bees building their honeycombs into the frames rather than to other parts of the housing. The honeycombs may easy be retrieved by removing the frames from the housing. In particular, the system may comprise preferably 9 frames being arranged in the beehive.

Given the usual dimensions of beehive, these numbers of frames provide frames of a good size for honeybees to build honeycombs into. Moreover, the preferred number of frames leads to larger distances between the frames, such that the air flow can pass between the frames, leading to a better control of the humidity and temperature conditions in the beehive.

Bee cluster is constructed a way that makes density of outer layers "shell" loose or soft depending on outside temperature, with the amount of produced energy, humidity, $CO_2$ (carbon dioxide) changing accordingly. The carbon dioxide proportion contained the air, surrounding cluster, play very important role in bee's winter survivability.

Higher concentration of $CO_2$, inside the cluster bees can create comfortable environment for inner layers of the cluster that is protected from outside world by the shell of $CO_2$. When bees become more immobile, they consume less amount of oxygen ($O_2$) for burning honey to create heat. For example, high concentration of $CO_2$ up to 4-5% starts to oppress the bees cluster as they soften the lower side of cluster's shell. Because of specific weights, the extra humidity leave cluster through the upper surface but $CO_2$ through the lower surface. To support this process, the opposite sides of the cluster will have different density as the upper side has lower density, and the lower side has higher density. These processes are pulsing based on the best comfort ability of the core of cluster, were the queen is located.

The average proportion of $CO_2$ in the whole mix of gases, specifically at lower elevations, would be slightly higher, especially in the lower boxes of the 9 frames bee hive, rather than in the 10 frames bee hive. This is because there is no way to escape or bypass this chamber at higher elevations by ventilation, but through the bottom openings only.

In another preferred embodiment, the system further comprises a heating element, which can be any electrical resistance, preferably laminated multilayer plastic with carbon strips between copper voltage carriers strips connected to the condition sensed control sensor and the electronics.

The electronics controls the second fan according to the sensed humidity and temperature condition. The electronics increases the voltage to 240 V applied to the heating element if the sensed humidity is above an upper humidity threshold.

Higher concentration of $CO_2$ in the bottom of bee hive area, using its physical property to absorb infrared radiation, utilize the heat/thermal energy, which is radiated by heating film mounted on the bottom board. This, as a second way of heat transfer, provides in addition to heating by thermal convection that air flow from outside passes in through the lower box of the bee hive to create a "higher temperature cloud".

Using both ways of heat transfer such as heat convection and heat radiation of heat energy, produced by heating film, to transfer to the cluster increase efficiency of the heating element, comfort ability for bees inside chamber during cold prolonged winter season.

When the main electrical power source is disconnected, the ventilation fans can be connected to the automobile battery power or "solar panel", which keeps the beehive system running with much more consumed honey by bees as an energy source. The two ventilation fans together can use 0.048 A of DC or 0.58 Watt of energy that an automobile battery can be used without battery recharge. Solar panels as a potential electrical power source can definitely also be used as a secondary electrical power source, as the highest energy consumption at the stage 2 would be 20.6 w. per 1 bee hive.

DETAILED DESCRIPTION OF THE INVENTION

FIG. 1 to FIG. 4 describes an embodiment of the present invention comprising a system for monitoring and controlling climate and moisture in a beehive. An assembly of top section where ventilation fans are located according to the embodiment of the present invention will be described with reference to FIG. 1.

Figure 1:
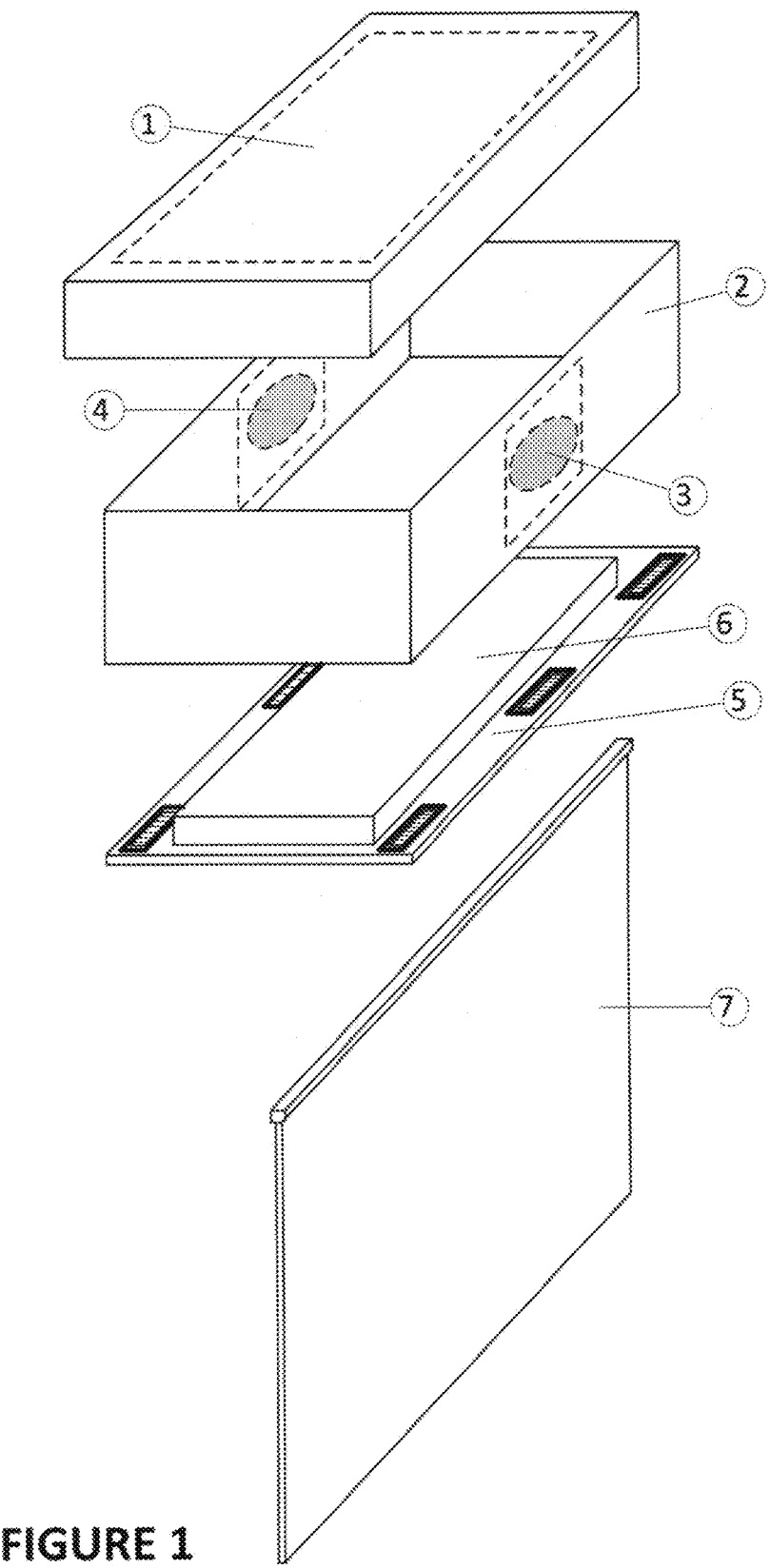
FIG. 1 shows a perspective view of the ventilation fans located in the top section of a beehive.
Figure 3:
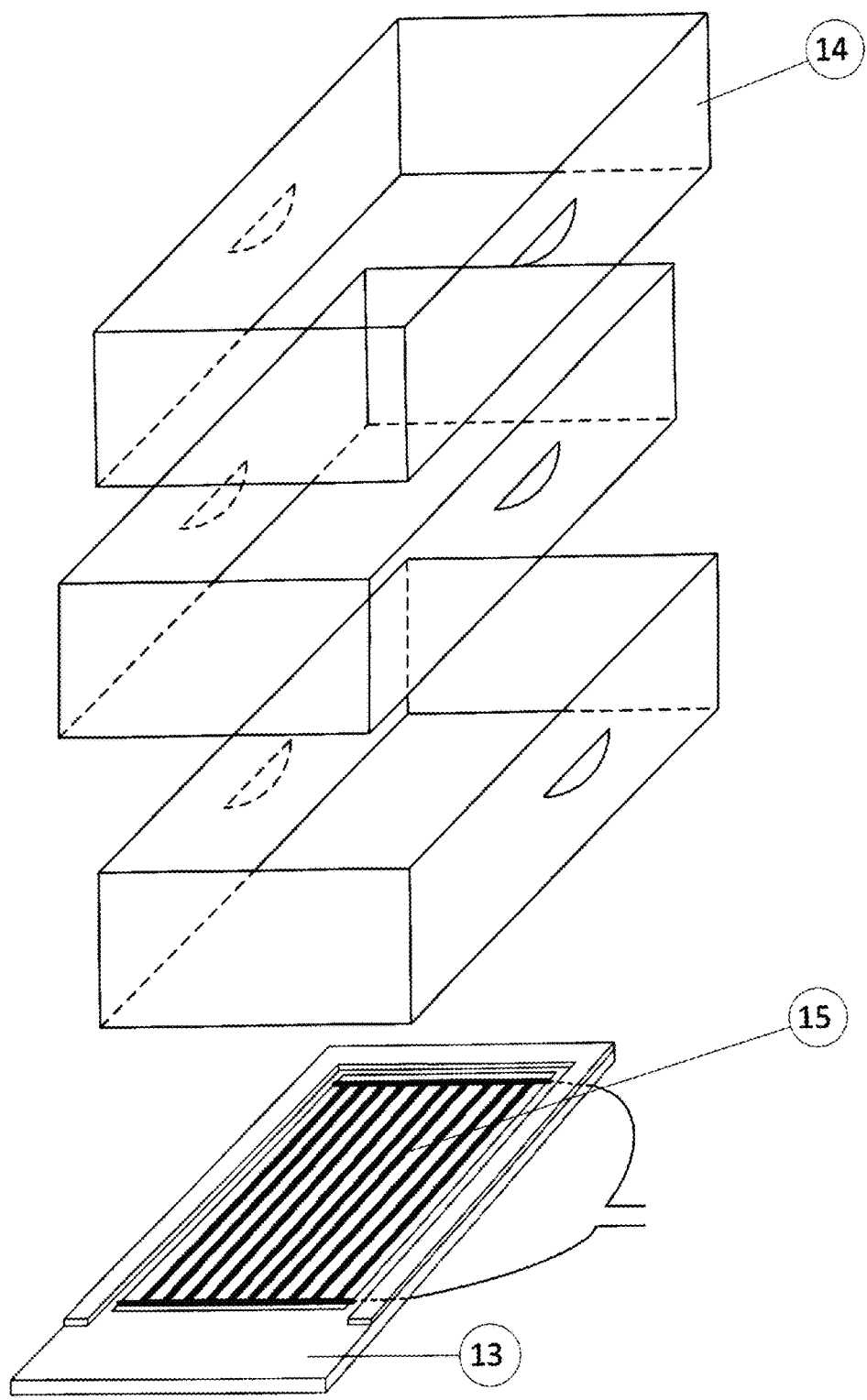
FIG. 3 shows a perspective view of the beehive heater installed in the bottom panel of the beehive.

Referring FIG. 1 and FIG. 3, the standard parts of a beehive assembly for beekeeping includes an outer cover 1 to be a put on top of a winter ventilation box 2 where first ventilation fan 3 and second ventilation fan 4 are adapted to generate an air flow from colony food box 14 to the winter ventilation box 2. In the embodiment shown on FIG. 1, the winter ventilation box 2 is open on a bottom side. The assembly further includes a winter ventilation inner cover 5 which is mounted near the lower edge of the winter ventilation box 2 and has mounted on its upper surface side wall diaphragm 7.

Still referring FIG. 1, the winter ventilation inner cover 5 comprises a plurality of rectangle holes covered by wire mesh to prevent bees from passing through. The holes will also lead the air flow being generated by the first ventilation fan 3 and the second ventilation 4 out of the beehive. In the center of the winter ventilation inner cover 5, there is a foam insulation 6 which is mounted upward to the bottom of the winter ventilation box 2 to prevent condensation on the inner surface.

Figure 2:
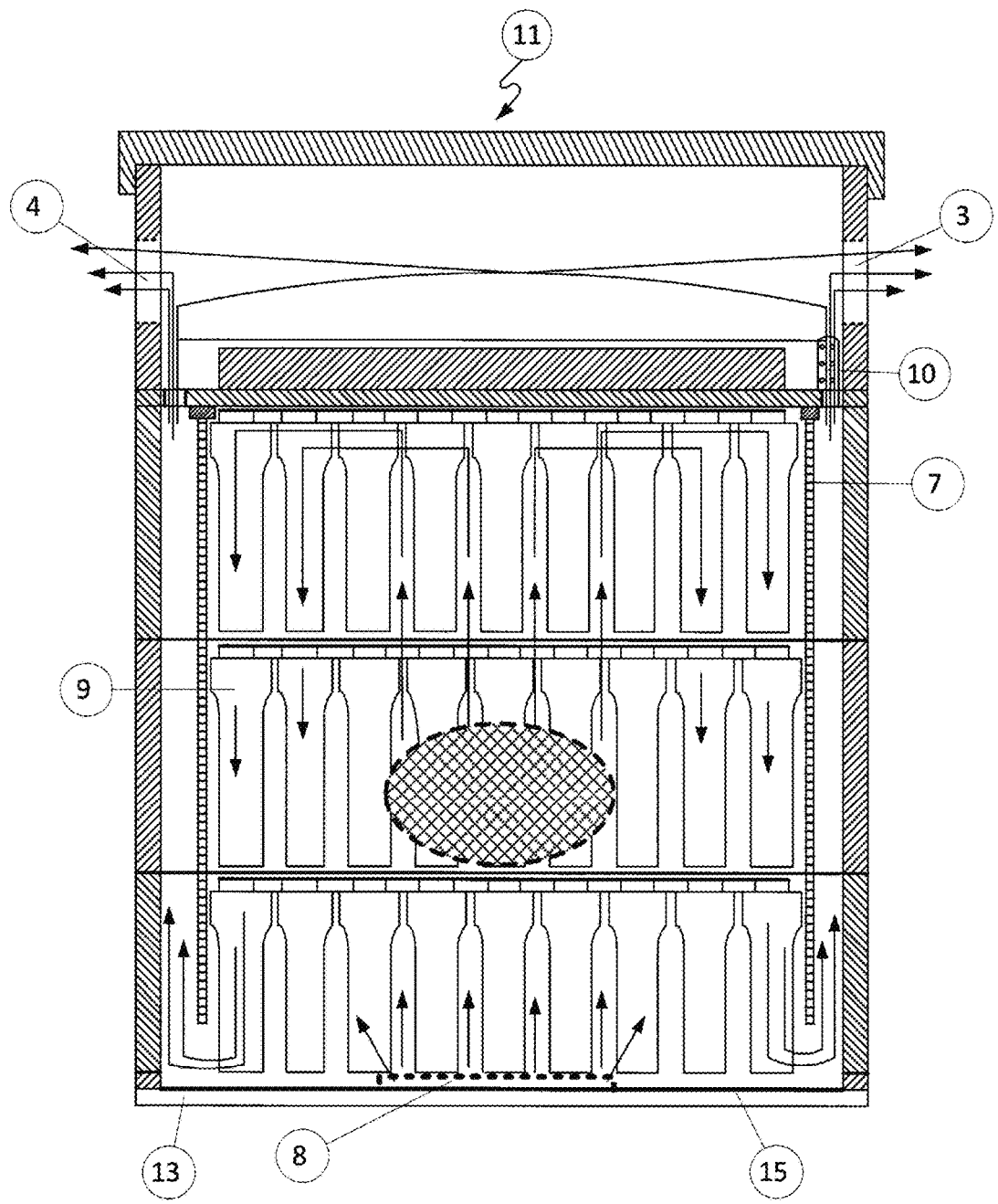
FIG. 2 shows a cross-sectional view of the beehive according to the preferred embodiment of the present invention.

Referring to FIGS. 2 and 3, a beehive enclosure 11 comprises colony brood boxes 14, a bottom board 13, in which is mounted heating element 15, and a side wall diaphragm 7, which is extending substantially vertical upwardly therefrom. The bottom board 13 is mounted near the lower edge of the side wall diaphragm 7. Heating element 15 is inserted between the bottom board 13 and a lower brood chamber. The bottom board 13 projects beyond the front of the lower brood chamber to provide air flow entrance 8.

FIG. 2 also shows the air flow pattern within the beehive enclosure 11. The air will flow out of the plenum system through the first ventilation fan 3 and the second ventilation 4, when the beehive temperature and humidity control system is in operation in response to the condition control sensor 10. The air flow through the entrance 8 in the bottom board 13 is heated by the heating element 15 and passing upwardly along the side wall diaphragm 7 through the holes of the winter ventilation inner cover 5 out of the beehive.

In the embodiment shown in FIG. 2, the beehive enclosure 11 also comprises nine honey comb frames 9. When installed, the frames 9 are spaced apart to provide extra space for the air flow between each pair.

Figure 4:
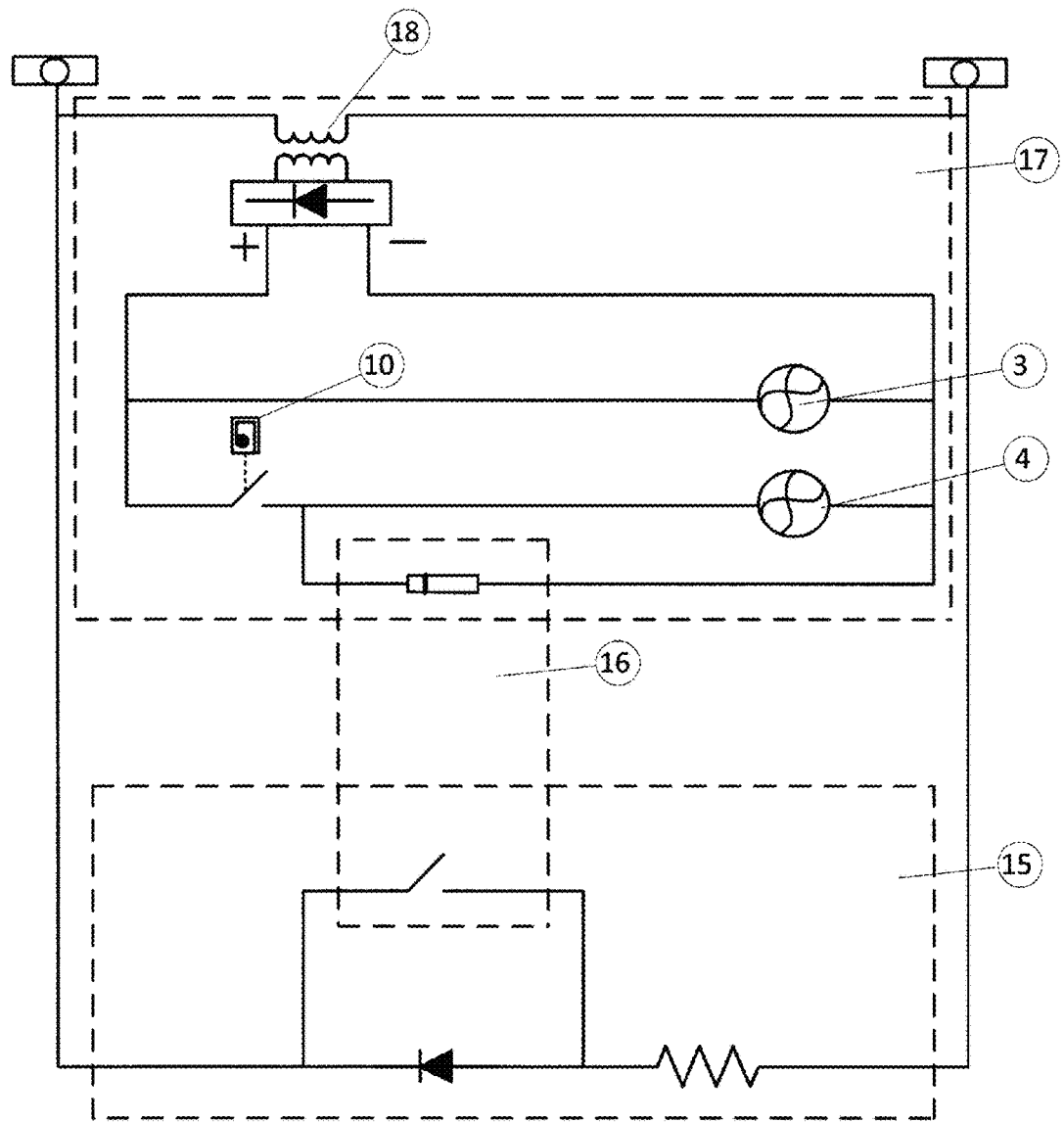
FIG. 4 shows an electrical control diagram to be used for the preferred embodiment of the present invention.

With reference to FIGS. 2 and 4, the beehive enclosure further comprises electronics 17 to control the first ventilation fan 3 and the second ventilation fan 4. The electronics 17 switches on the first fan 3 and heating element 15 to run continuously in order to generate a negative air flow pressure within the beehive enclosure 11. The electronics 17 is, moreover, connected to a condition control sensor 10, which takes the form of a dual sensor for, both, temperature and humidity. The condition control sensor 10 is arranged on the side wall diaphragm 7. The electronics 17 controls the second fan 4 according to signals from the condition control sensor 10.

In other embodiments, the condition control sensor 10 may be placed in other positions in the beehive enclosure 11, e.g. under side of the outer cover 1.

Returning to FIG. 4, in some embodiments, the electronics 17 controlling the second fan 4 may comprise complete activation or deactivation of the second fan 4. In these embodiments, the second fan 4 either runs on a maximum power or is complete switched off, based on the sensed condition sensor 10, to increase the negative air flow pressure out of the beehive enclosure 11. The second fan 4 is activated if the sensed humidity and temperature are above the upper humidity thresholds. However, the second fan 4 is deactivated if the sensed humidity and temperature are below the lower humidity and temperature thresholds. For example, the electronics 17 may switch on the second fan 4 if the sensed temperature is 12° C. and the sensed humidity is above 85% and switch off the second fan 4 if the sensed humidity is below 80%. In all other cases, the electronics 17 does not change the previous powering stage of the second fan 4.

An AC-to-DC converter 18 connected to the power source to convert supply voltage into the first fan 3 and the second fan 4. When the converter 18 detects AC supply voltage from the power source, it automatically converts to DC supply voltage into the first fan 3.

Moreover, in some embodiments, the beehive climate and moisture control system may include more than two fans to provide a more detailed control of the air flow in the beehive enclosure. The fans are connected and controlled by the electronics 17.

Still in FIG. 4, in other embodiments, electronics 16 may control the heating element 15 to switch to intermediate power values larger than 120 V and lower than 240 V, based on the sensed condition sensor 10. Here, both continuous and discontinuous power values may be used.

Having illustrated and described the principles of the present invention in a preferred embodiment, it will be apparent to those skilled in the art that the embodiment can be modified in arrangement and detail without departing from such principles. Any and all such embodiments are intended to be included within the scope of the following claims.

What is claimed is:

1. A beehive temperature and humidity control system for preventing water condensation and mold inside said beehive and removing excessive moisture from said beehive in a cold and freeze climate environment, comprising:
   (a) at least one condition control sensor to sense humidity and temperature inside said beehive, wherein said at least one condition control sensor has upper and lower humidity and temperature thresholds determined by a user;
   (b) a first ventilation fan being arranged at an opening on a top side wall of said beehive, said first ventilation fan running continuously to generate out-going air flow along side walls of said beehive for preventing formation of water saturated air condensation, and at least one second ventilation fan being arranged at an opening on an opposite top box side wall of said beehive to be activated for dehumidifying said beehive when said humidity inside said beehive is higher than said upper humidity threshold;
   (c) a ventilation circuit connected to said at least one condition control sensor and said at least one second ventilation fan, wherein said ventilation circuit controls said at least one second ventilation fan according to humidity and temperature sensed by said at least one condition sensor;
   (d) a heating element located at a bottom panel of said beehive to preheat incoming air flow from outside flowing into said beehive through an opening entrance at a bottom of said beehive;
(e) a heating circuit connected to said heating element and said at least one condition control sensor;
(f) honey comb frames being arranged in said beehive;
(g)
(h)
(i) an AC-to-DC supply voltage converter for said first ventilation fan and said at least one second ventilation fan;
(j) an electrical power supply source; and
(k) a ceiling foam insulation to prevent water condensation on an inner surface of said beehive.

2. The system of claim 1, wherein said at least one condition control sensor further comprises at least one temperature sensor and at least one humidity sensor to sense temperature and air humidity conditions inside said beehive, wherein the conditions correspond to an average humidity and temperature sensed by said at least one temperature sensor and said at least one humidity sensor.

3. The system of claim 1, wherein said ventilation circuit activates said at least one second ventilation fan if humidity is above upper humidity threshold and/or temperature is below said lower temperature threshold.

4. The system of claim 1, wherein the ventilation circuit deactivates said at least one second ventilation fan if the humidity is below said lower humidity threshold and/or temperature is above said upper temperature threshold.

5. The system of claim 1, wherein said heating element is selected from the group consisting of laminated carbon heating film, electrical resistance, and any combination thereof.

6. The system of claim 1, wherein said heating circuit controls said heating element according to the temperature and the humidity sensed by said condition control sensor.

7. The system of claim 1, wherein said heating circuit further comprises an output of a solid state relay circuit being connected to the heating element.

8. The system of claim 7, wherein said heating circuit activates the solid state relay circuit if the humidity is above the upper humidity threshold and/or the temperature is below the lower temperature threshold.

9. The system of claim 7, wherein said heating circuit deactivates the solid state relay circuit if the humidity is below the lower humidity threshold and/or temperature is above the upper temperature threshold.

10. The system of claim 1, wherein said honey comb frames further comprises at least nine removable frames being arranged in the beehive.

11. The system of claim 1, wherein said ventilation circuit further comprises at least one analog-to-digital converter for converting signals received from said at least one condition control sensor.

12. The system of claim 1, wherein said AC-to-DC converter further comprises an AC detector to automatically detect AC supply voltage and convert to DC supply voltage for the ventilation fans.

13. The system of claim 1, wherein said electrical power source further comprises a secondary power source.

14. The system of claim 13, wherein said secondary power source is selected from group consisting of battery, solar, and any combination thereof.

* * * * *